United States Patent
Correa Delgado et al.

(10) Patent No.: US 8,083,829 B2
(45) Date of Patent: Dec. 27, 2011

(54) ORGANIC WATER RETENTION MIX FOR USE ON SOIL

(76) Inventors: Hector Luis Correa Delgado, Wheaton, IL (US); Eduardo Esperon Gonzalez, Chihuahua (MX)

(\*) Notice: Subject to any disclaimer, the term of this patent is extended or adjusted under 35 U.S.C. 154(b) by 0 days.

(21) Appl. No.: 13/026,094

(22) Filed: Feb. 11, 2011

(65) Prior Publication Data

US 2011/0163266 A1 Jul. 7, 2011

(51) Int. Cl.
*C05F 3/00* (2006.01)
(52) U.S. Cl. ............. 71/21; 71/11; 71/15; 71/25; 71/63; 71/903
(58) Field of Classification Search ............ 71/6, 9, 71/23, 11, 27, 15, 21, 25, 63, 903
See application file for complete search history.

(56) References Cited

U.S. PATENT DOCUMENTS

| | | | |
|---|---|---|---|
| 5,631,078 A * | 5/1997 | Ellery et al. | 428/311.71 |
| 6,302,936 B1 * | 10/2001 | Adam | 71/13 |
| 6,852,142 B2 | 2/2005 | Varshovi | |
| 6,855,182 B2 | 2/2005 | Sears | |
| 7,413,383 B2 | 8/2008 | Adams | |
| 2004/0115090 A1 | 6/2004 | Andersson | |
| 2009/0241624 A1 | 10/2009 | Audet | |

FOREIGN PATENT DOCUMENTS

| | | |
|---|---|---|
| DE | 10 2007 047 533 A1 | 10/2007 |
| EP | 0673903 B1 | 3/1995 |
| EP | 0746534 B1 | 12/1996 |
| FR | 2829488 A | 3/2003 |
| GB | 0492596 | 8/1937 |
| GB | 0626557 | 3/1948 |
| WO | 2006073301 A1 | 7/2006 |

* cited by examiner

*Primary Examiner* — Mark Kopec
*Assistant Examiner* — Haidung Nguyen
(74) *Attorney, Agent, or Firm* — Barbara J. Luther; The Luther Law Firm, PLC

(57) ABSTRACT

An organic mixture for retaining water in soil includes 30 to 38 kg of cellulose fiber waste or paper sludge, 8 to 13 kg of dry sawdust or wood shavings, 30 to 50 kg of top soil, 4 to 6.5 kg of manure, and 11.45 to 20 kg of calcium carbonate.

6 Claims, 2 Drawing Sheets

| Sample | Wet Sample (grams) | Dry Sample (grams) | Water (grams) | Humidity % |
|---|---|---|---|---|
| 1 | 5.1648 | 1.1011 | 4.0637 | 78.68 |
| 2 | 5.0133 | 1.0082 | 4.0051 | 79.88 |
| 3 | 5.0930 | 1.0764 | 4.0166 | 78.80 |
| 4 | 6.1166 | 1.2186 | 4.8980 | 80.07 |
| 5 | 6.1343 | 1.2609 | 4.8734 | 79.44 |
| 6 | 6.1988 | 1.2534 | 4.9554 | 79.77 |
| 7 | 10.0000 | 2.1023 | 7.9000 | 78.98 |
| 8 | 10.0020 | 1.9002 | 8.1002 | 80.99 |

Figure 1

| Element | Percentage (%) |
|---|---|
| Nitrogen (N) | 1.3050 |
| Phosphorus (P) | 0.0722 |
| Potassium (K) | 0.1700 |
| Calcium (Ca) | 4.7800 |
| Magnesium (Mg) | 0.1350 |
| Sodium (Na) | 0.0745 |
| Copper (Cu) in ppm | 57.50 |
| Iron (Fe) in ppm | 518.5 |
| Mangnesium (Mn) in ppm | 128.0 |
| Zinc (Zn) in ppm | 67.50 |
| Calcium Chloride(CaCl2) in ppm | 6.25 |

Figure 2

ORGANIC WATER RETENTION MIX FOR USE ON SOIL

TECHNICAL FIELD

This invention is in the field of products to improve soil water retention. Specifically the product utilizes a variety of organic waste products to accomplish this purpose.

BACKGROUND

A variety of products are marketed to improve water retention of soils. They include gels, beads or other compounds based on petroleum or oil derivatives. These products are not only based on non-renewable resources but also require special handling and application procedures since they contain chemical agents that can be hazardous if long term exposure or mishandling occurs during its storage or application. Most of these products are not suitable for large farms or forest areas due to their high cost. Even if their cost is reduced through more efficient processes or subsidies, many of the existing products contain chemical agents that make them non-suitable or not recommended for use in some crops. Existing products in this category use expensive, non-renewable raw materials such as petroleum, or chemical compounds that make them hazardous for use in farming land or for human consumption crops.

There exist also organic materials that are used to aid in water retention on soils. Prominent in this category are compost, mulch and other mineral-based products.

Compost is obtained from the decomposition process of organic waste assisted by waste-digesting worms that accelerate the process of decomposition. Worms accelerate this process creating an organic mass that has some water retention capabilities. In some regions in the southwest United States, compost is used as an aid in the maintenance of golf courses. However, the production cycle for compost is extremely long, the production of a metric ton of compost requires months of decomposition of organic material and it is a process that cannot be industrialized easily. This makes the cost of the compost increase and the production volumes shrink. Even though compost is an organic and renewable alternative, the limitations in production capacity and the elevated cost related to its production importantly hamper its viability as an option to reduce water consumption for large arid regions that have a strong population growth and a growing demand for water.

Mulch is usually obtained from bark, compost, grass clippings or straw and is spread or laid over the surface of the soil as a covering. It is used to retain moisture in the soil and suppress weeds. It also keeps the soil cool and makes the garden bed look more attractive. Organic mulches also help improve the soil's fertility, as they decompose. Compost and mulch have a low percentage of water retention for their weight or volume. Both materials also lose accumulated moisture at a high rate.

SUMMARY OF INVENTION

In one embodiment, there is an organic mixture for retaining water in soil, the mixture comprising 30 to 38 kg of cellulose fiber waste or paper sludge, 8 to 13 kg of dry sawdust or wood shavings, 30 to 50 kg of top soil, 4 to 6.5 kg of manure, and 11.45 to 20 kg of calcium carbonate. Optionally, this organic mixture has a cellulose fiber waste or paper sludge content of about 33 kg. Optionally, this organic mixture has a dry sawdust or wood shaving content of about 11 kg. Optionally, this organic mixture has a topsoil content of about 40 kg. Optionally, this organic mixture has a manure content of about 5.5 kg. Optionally, this organic mixture has a calcium carbonate content of about 15 kg.

In another embodiment, there is disclosed a method of preparing an organic water retention mix for use on soil, the method comprising the steps of a. providing 30 to 38 kg of cellulose fiber waste, 8 to 13 kg of dry sawdust or wood shavings, 35 to 50 kg of topsoil, 3 to 6.5 kg of manure, and 11.45 to 20 kg of calcium carbonate; and b. mixing by mechanic agitation for a period of 28 to 35 seconds. Optionally, the mixing only lasts about 30 seconds.

BRIEF DESCRIPTION OF THE FIGURES

For a further understanding of the objects and advantages of the present invention, reference should be had to the following detailed description, taken in conjunction with the accompanying drawing, in which like parts are given like reference numbers and wherein:

FIG. 1 shows the final humidity percentages of the cellulose fibers after being dehydrated in a laboratory stove.

FIG. 2 shows the chemical analysis (characterization) of the organic water retention mix for use in soil.

DETAILED DESCRIPTION OF THE INVENTION

With the purpose of reducing the use of water in irrigation and keeping in mind the advantages and disadvantages of existing products, we developed the inventive mixture. The invention was the development of a cellulose polymer based compound mixed with other natural materials that aid in water retention on arid or drought areas to improve the performance of farming, grazing and forest soils as well as to help reduce water consumption in city parks and recreation areas and domestic green areas.

The inventive mixture uses solid residues (or waste) from the paper mills and paper recycling plants and other manufacturing facilities. This paper waste has the characteristic that is composed by cellulose fibers with a high moisture absorption capacity and moisture retention for long periods of time. This cellulose fiber waste, when combined with other materials mentioned in the following paragraphs, forms a new mixture that has the capacity to store moisture for later transfer to the soil where it is applied, the mix improves the mechanical characteristics of the soil by improving its PH levels and also aids in improving the biological and physiological characteristics of the soil by creating a favorable environment for microorganism growth in the soil.

This inventive mix was designed to provide the water-retention benefits of the cellulose material on the soil for long periods of time. These benefits are also received by the underlying ground where not just the top layer is improved, but where grass roots usually grow and also deeper layers that other type of vegetation such as trees, crops and bushes use to retrieve nutrients. The mix contributes to:

Reduce the number and frequency of irrigation cycles.
Improve the texture, structure, porosity, permeability, and density in the soil.
Improve the conductivity, plasticity, and capillary capacity of the soil.
Improve the pH level in the soil.
Create a favorable environment for microorganism and bacteria growth.

The invention herein presented is the development of an organic water retention mix for use on soil which is composed of the following materials.

Cellulose fiber waste from 30 to 38 Kg, preferably about 33 Kg.

Dry sawdust or wood shavings from wood processing from 8 kg to 13 kg, preferably about 11 kg.

Top soil from 35 kg to 50 kg, preferably about 40 kg.

Manure from 4 kg to 6.5 kg, preferably about 5.5 kg.

Calcium carbonate from 11.45 kg to 20 kg, preferably about 15 kg.

The preparation process for the organic water retention mix for use on soil consists in measuring and transferring the cellulose fiber waste, the dry sawdust or wood shavings, the top soil, manure, and calcium carbonate into a horizontal industrial mixer to be mechanically mixed for a period of 25 to 35 seconds, preferably 30 seconds.

FIG. 1 shows the humidity percentage present in the cellulose fiber waste that is used for the mix with the dry sawdust or wood shavings, the top soil, manure, and calcium carbonate.

The organic water retention mix for use on soil has a varied ionic composition; this ionic composition is the result of the different elements used in the mix such as the cellulose fiber, dry sawdust or wood shavings, top soil, manure, and calcium carbonate. This ionic composition is depicted in FIG. 2.

The main component in the organic water retention mix is waste from the paper recycling or paper production process that is also known as cellulose fiber waste. This cellulose fiber waste contains small polymers with hygroscopic properties that give it a great capacity to absorb, retain, and transfer water to the soil slowly and progressively. This material can retain four to five times its dry weight in water which is later slowly transferred to the soil. During this transfer process, the cellulose waste also helps increase the temperature in the soil, through the natural decomposition process of the organic material and the bacteria found in the mix, and helps increase the percentage of moisture in the soil aiding in the growth and development of plants for long periods of time that range from 10 to 15 days. Workers check on the water content of the soil after about 10 days and may not even water until two whole weeks have passed. Therefore, the use of this inventive mixture reduces the maintenance and preventive irrigation costs, energy consumption, and water.

The critical element for water retention and use of recycled materials is the cellulose fiber waste which has markedly different water retention properties from ordinary paper waste or paper that is pulverized to a certain size. We will describe in detail the particular component we use in detail in the following paragraph.

During the recycling process for paper or cardboard, the paper/cardboard is cleaned, washed and stripped of any other materials like ink, glue or plastic films that have been applied previously. After this step, the material is pulverized to a standard size. Paper or cardboard can be recycled several times; but during every cycle, the paper fibers are broken to a smaller size. For paper fibers to reattach together and create new sheets of paper or cardboard, the fibers must have a minimum length that allows them to reattach. The too-short paper fibers do not reattach but remain in the liquid form. These short fibers are discarded as waste and receive the name paper "sludge," a term commonly used in the paper industry. This sludge is useless to create new paper products. Usually recycling companies are paid to haul the paper sludge to landfills or other disposal facilities.

The major advantage of using the paper sludge instead of pulverized paper or cardboard is that these short fibers have a bigger capacity to retain water compared to the other fibers of longer length. As we have observed, the longer the fiber, the less capacity of the material to retain water. While our inventive mixture can use pulverized paper or sludge, we provide cost and water retention benefits with paper sludge.

However, paper sludge is difficult to use in its unprocessed form. It is a very thick paste with a very high humidity percentage. If it is completely dried, the paste turns into a hard, even more unworkable product. In order to make the paper sludge more suitable, light and manageable for its final purpose, we experimented with other components to help "break" the paste, seeking other discarded products.

We added sawdust or wood shavings to the mix with the purpose of absorbing some of the humidity from the sludge paste. We were pleasantly surprised that the sawdust also eliminated the noxious odor of the sludge paste. The sawdust completely eliminated the sludge odor and gave it a nice wood odor, which is beneficial when large areas are covered with the inventive mix. Had we not eliminated this odor, the product would not be as acceptable to the public.

The topsoil serves several purposes. It helps break down the sludge paste into particles no longer than one inch. It also helps absorb additional moisture from the sludge paste to make it more manageable and spreadable. The topsoil also acts to transport the humidity from the paper sludge to the soil on which it is applied. The topsoil also aids in the transfer of the nutrients found in manure which acts as a natural fertilizer.

We added calcium carbonate for multiple effects. Preferably the calcium carbonate is pulverized to the size of small rocks one half to one quarter inch in size. Mixing this with the paper sludge also breaks down the paste and reduces the amount of top soil required. Calcium carbonate also helps neutralize the pH value of the final mix to make it more suitable for arid soils or soils under severe drought. As substitutes of calcium carbonate rocks, we can also use calcite or limestone.

Using the materials mentioned in this document, cellulose fiber waste, dry sawdust or wood shavings, top soil, manure, and calcium carbonate, in the proper quantities allows us to create a new material that can be produced in large quantities, and whose mechanical and biological properties improve the levels of humidity in the soil. For the large quantities we make, we tried different types of mechanical mixers and found that a vertical mixer gave more homogeneous results. Also, during the gradual decomposition and fermentation process of this new material, the mix helps incorporate organic matter into the soil and subterranean layers, further aiding in the development of stronger root systems for plants and crops wherever it is used.

The organic water retention mix for use on soil is a new mixture with high humidity content and rich in organic, 100% natural materials that can be used in farming for regular crops, fruit producing trees, grazing and forest land, as well as in parks and recreation areas in cities or towns and in any area where it is necessary to increase the percentage of humidity in the soil and subterranean layers.

The final product can be used or applied directly over the soil as a top layer that is simply used to cover the surface of the soil or it can be mixed with the top layer of soil that is targeted for improvement. It can also be used in pots or in tree ponds above or below the soil. The same process can be used for grass. For optimal humidity retention level in the soil, it is recommended, regardless of the method chosen for application, that the depth of the layer of this mixture is at least 1.5 inches.

Although specific embodiments have been illustrated and described herein, those of ordinary skill in the art will appreciate that any arrangement calculated to achieve same purposes can be substituted for the specific embodiments or exemplary methods shown. This disclosure is intended to cover any and all adaptations or variations of various embodiments of the invention. It is to be understood that the above description has been made in an illustrative fashion, and not a restrictive one. Combinations of the above embodiments, and other embodiments not specifically described herein will be apparent to those of skill in the art upon reviewing the above description. The scope of various embodiments of the invention includes any other applications in which the above structures and methods are used. Therefore, the scope of various embodiments of the invention should be determined with reference to the appended claims, along with the full range of equivalents to which such claims are entitled.

In the foregoing description, if various features are grouped together in a single embodiment for the purpose of streamlining the disclosure, this method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims, and such other claims as may later be added, are hereby incorporated into the description of the embodiments of the invention, with each claim standing on its own as a separate preferred embodiment.

Having described the invention sufficiently, I consider it as a novelty and therefore I claim of my exclusive property, the invention described in the following clauses:

The invention claimed is:

1. An organic mixture for retaining water in soil, the mixture comprising
   a. 30 to 38 kg of cellulose fiber waste or paper sludge resulting from paper manufacturing and/or recycling,
   b. 8 to 13 kg of dry sawdust or wood shavings,
   c. 30 to 50 kg of top soil,
   d. 4 to 6.5 kg of manure, and
   e. 11.45 to 20 kg of calcium carbonate.

2. The organic mixture of claim 1, wherein the cellulose fiber waste or paper sludge comprises about 33 kg.

3. The organic mixture of claim 1, wherein the dry sawdust or wood shavings comprises about 11 kg.

4. The organic mixture of claim 1, wherein the topsoil comprises about 40 kg.

5. The organic mixture of claim 1, wherein the manure comprises about 5.5 kg.

6. The organic mixture of claim 1, wherein the calcium carbonate comprises about 15 kg.

\* \* \* \* \*